United States Patent [19]

Scotton et al.

[11] Patent Number: 4,829,519

[45] Date of Patent: May 9, 1989

[54] AUTOMATIC CELL TRANSFER SYSTEM WITH ERROR RATE ASSESSMENT

[76] Inventors: Geoffrey R. Scotton, 5768 Crown St., Vancouver, British Columbia, Canada, V6N 2B7; Gary W. Kenward, 9211 Arrowsmith Dr., Richmond, British Columbia, Canada, V7A 4Z5

[21] Appl. No.: 61,191

[22] Filed: Jun. 9, 1987

[51] Int. Cl.[4] .................. G08C 25/00; G06L 11/00
[52] U.S. Cl. ................................. 371/5; 455/33; 455/56
[58] Field of Search ............... 371/5; 455/8, 33, 56, 455/62, 63

[56] References Cited

U.S. PATENT DOCUMENTS

| | | | |
|---|---|---|---|
| 2,649,141 | 11/1954 | Mitchell | 250/6 |
| 3,596,245 | 7/1971 | Finnie et al. | 371/5 |
| 3,689,884 | 9/1972 | Tew, Jr. | 371/5 |
| 3,760,354 | 9/1973 | Ginn | 371/5 |
| 3,824,548 | 7/1974 | Sullivan et al. | 371/5 |
| 4,034,340 | 7/1977 | Sant'Agostino | 371/5 |
| 4,308,429 | 12/1981 | Kai et al. | 179/2 EB |
| 4,328,581 | 5/1982 | Harmon et al. | 455/62 |
| 4,419,766 | 12/1983 | Goeken et al. | 455/62 |
| 4,475,010 | 10/1984 | Huensch et al. | 179/2 EB |
| 4,598,042 | 6/1986 | Stangl | 455/56 |

Primary Examiner—Charles E. Atkinson
Attorney, Agent, or Firm—C. A. Rowley

[57] ABSTRACT

An automatic cell transfer is made, when a mobile detects certain threshold exit bit or symbol error rate in a message transmitted from the base station with which it is communicating, by the mobile then sampling sequentially transmitted messages from adjacent base stations (on the same or different frequencies) and monitoring their bit or symbol error rates until a base station is found having a bit or symbol error rate less than a preselected minimum entry threshold bit or symbol error rate which in turn is less than the exit bit or symbol error rate and transferring communication from the mobile to the base station so selected. In one arrangement, each base station repeatedly and intermittently transmits a known quality assessment message and the mobile continually reviews the received message for its error rate.

7 Claims, 2 Drawing Sheets

AUTOMATIC CELL TRANSFER SYSTEM WITH ERROR RATE ASSESSMENT

FIELD OF THE INVENTION

The present invention relates to cell transfer system, more particularly the present invention relates to a cell transfer system based on assessment of bit or symbol error rate by the mobile of a message it received.

BACKGROUND TO THE PRESENT INVENTION

It is not uncommon to communicate data over mobile radio. Generally, the areas covered by the mobiles is significantly greater than the area that can be serviced from a single base station and thus a plurality of base stations have to be arranged in a group with a single or plurality of frequency assignments and the mobile must be capable of transferring communication from one base station to another as the mobile travels beyond the range of the one base station. This is obtained by distributing base stations throughout the total area to be serviced with each base station providing local coverage and a central control unit which is remotely linked to these base stations controlling the operations and transmission of the base stations. As above indicated, these base stations are selectively linked to the mobile stations within their service area.

Various systems have been devised to permit the mobile to transfer from one base station to another as the signal from the one base station is no longer acceptable. A typical such system normally utilizes the base stations to monitor the signal strength of the signal received from the mobile with which it is communicating and when the signal strength drops below a threshold level the mobile is automatically transferred to a second station receiving a significantly stronger signal from the mobile. U.S. Pat. No. 4,308,429 discloses a similar system for voice transmission.

U.S. Pat. No. 2,694,141 describes a system designed for terrestrial telephony requirements and initiates a channel reselection on the basis of a high noise to signal ratio, thus while it does in a sense monitor quality of the transmitted signal it would not be effective for data transmission between base stations and a mobile unit.

U.S. Pat. No. 4,419,766 relates to a system designed for air-borne telephony requirements and maintains cooperation with a single transmitter during the entire transmission, however its selects the transmitter with which it will communicate for the call by the air-borne unit assessing the signal strength and doppler shift in the signals from the transmitters.

U.S. Pat. No. 4,598,042 also describes a system for telephony requirements i.e. voice transmission and makes a transfer selection based on received signal strength at the mobile. This system does not accommodate base transmitters that are continuously keyed and appears to be adapted to only single frequency use within all areas operation.

It has been found that for data transmission systems the monitoring of signal strength and the use of signal strength to determine when a transfer is to be made is in itself inadequate.

BRIEF DESCRIPTION OF THE PRESENT INVENTION

It is an object of the present invention to provide an improved automatic cell transfer system wherein cell transfer is automatically made by a mobile based on assessment of the bit or symbol error rate of messages transmitted from the base stations and received by the mobile.

Broadly, the present invention relates to a cell transfer method for automatically transferring communication between a mobile and a first base station from said first base station to a selected second base station comprising transmitting messages from each base station of a plurality of base stations, said mobile monitoring said message transmitted by said one base station and received by said mobile and determining a bit or symbol error rate based on at least some of said messages transmitted from said one station and received by said mobile, when said mobile detects a bit or symbol error rate in said at least some of said messages from said one station above a threshold exit bit or symbol error rate, said mobile automatically sequentially monitoring said messages transmitted from adjacent of said base stations (on the same or a different frequency) to determine their bit or symbol error rate, selecting a selected second base station based on the signal from said selected second base station having a bit or symbol error rate as detected by said mobile below a selected entry threshold symbol error rate and said mobile communicating with said selected second base station.

The present invention provides several systems for assessing the bit or symbol error rate for the signals received by the mobile from the base stations or vice versa comprising comparing the received message with the same message after it has be corrected by application of an error correcting code and determining the difference between the two messages to provide the symbol error rate.

Preferably the bit or symbol error rate will be determined by comparing each respective bit in the two messages being compared to determine the bit or symbol error rate.

In a preferred system, each base station will periodically transmit known quality assessment messages and for the mobile to assess said known quality assessment messages emanating from the base station with which it is communicating and initiate a search for a replacement base station when the error rate detected in the quality assessment messages being assessed by the mobile exceeds a preset exit threshold level and said mobile selecting a replacement base station by assessing the known quality assessment from adjacent base stations until one is found having a bit or symbol error rate less than a preset entry threshold bit or symbol error rate the is less than said exit threshold bit or symbol error rate by a preset amount.

Preferably the bit or symbol error rate will be monitored over a period of time and averaged based on at least two (2) transmissions of said known message by the base station being monitored.

BRIEF DESCRIPTION OF THE DRAWINGS

Further features, objects and advantages will be evident to those skilled in the art based on the following detailed description of the preferred embodiments of the present invention taken in conjunction with the accompanying drawings in which.

DESCRIPTION OF THE PREFERRED EMBODIMENTS

Figure 1:
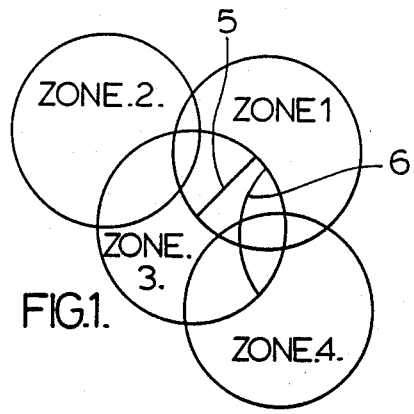
FIG. 1 shows a typical arrangement of zone coverage by a plurality of discrete base stations arranged as a unit.

Referring to FIG. 1, it can be seen that there are various zones (only 4 zones illustrated) numbered zones 1,2,3 and 4, the maximum coverage of each of which is indicated by its respective circle with the circle representing zone 1 overlapping with the circles representing zones 2,3 and 4. In the illustrated arrangement, a mobile travelling from zone 1 towards zone 3 depending on its location will transfer from zone 1 directly to zone 3 for example if it was driving straight from the centre of zone 1 towards the centre of zone 3 i.e. along line 5, alternatively if the mobile was driving to zone 4 from zone 1 while passing through a portion of zone 3 it might well transfer to zone 3 and then to zone 4 depending on its path i.e. line 6. The actual transfer will be controlled in the manner that will be discussed hereinbelow.

The present invention bases cell transfer upon an evaluation of the outbound signal data transmission quality namely the data transmitted from a base station and received by the mobile station. Each mobile terminal is provided with a computer adapted to periodically assess the quality of the current channel with which the mobile is communicating and if at any time the quality is determined not to meet a preset standard the mobile begins a sequential search for a better channel or signal and switches to the first channel it finds that provides an acceptable level of coverage, however if an acceptable channel is not found the mobile continues to communicate with the original channel with which it was communicating.

Figure 2:
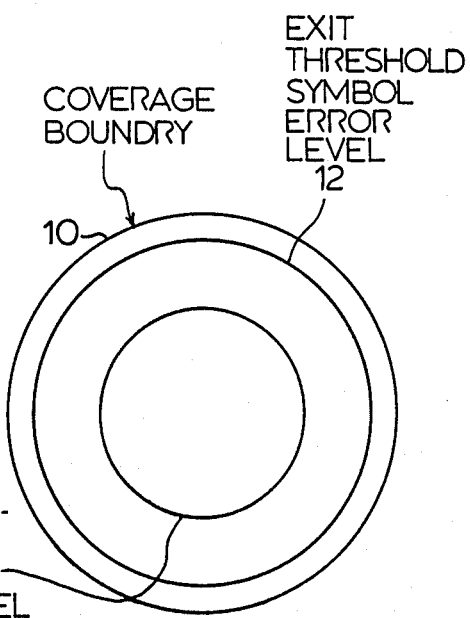
FIG. 2 is a schematic representation of the coverage zone of a single base station indicating the periphery of its entering threshold and exit threshold bit or symbol error level.

The area of communication of a base channel is indicated by the largest radius circle of FIG. 2 which has been designated as the coverage boundary 10 for the zone serviced by that base station. Space inwardly i.e. at a shorter radius from the base station the signal quality reaches a level that while still being acceptable indicates that the coverage boundary for that channel or base station is approaching. This level is designated as 12 and is referred to as the exit threshold bit or symbol error level or rate. Thus a mobile travelling in the area bounded on one side by the coverage boundary 10 and the other side by the exit threshold level 12 will still be able to maintain satisfactory communication with the base station represented by the figure, but will when the exit threshold 12 is detected commence sequentially sampling adjacent base stations or channels looking for a channel having a higher signal quality represented by a bit or symbol error rate significantly lower than the exit threshold bit or symbol error rate that triggered the search for the better station. Thus the bit or symbol error rate for the selected channel must be below a preset level to be selected. This predetermined minimum is schematically illustrated by the circle 14 which is designated as the entry threshold symbol error level or rate.

Figure 3:
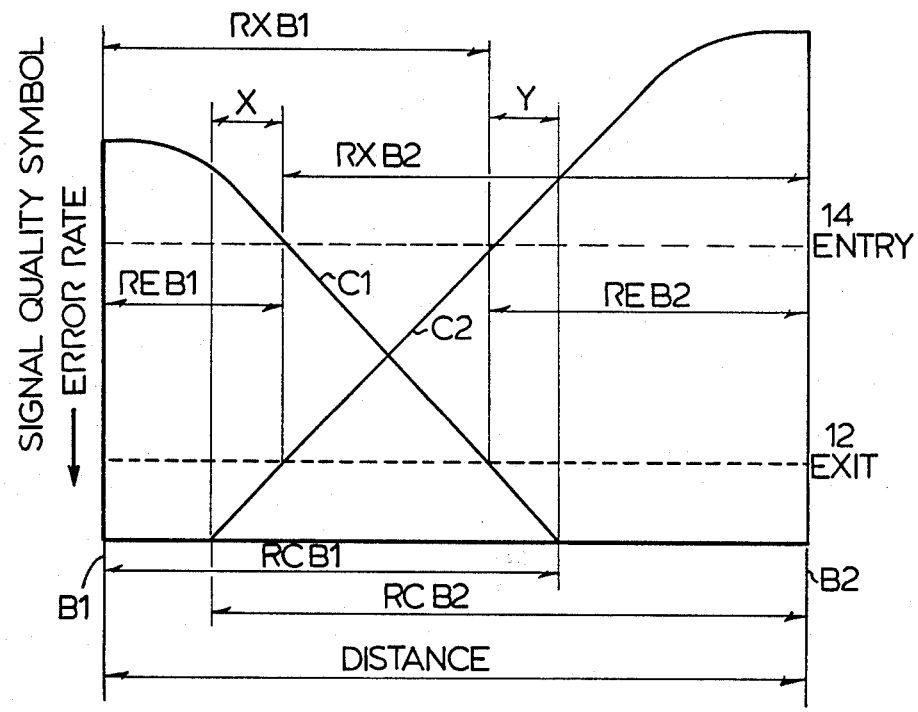
FIG. 3 is a plot of signal quality relative to distance from two separate base transmitters showing the overlap between exit and entry threshold bit or symbol error levels.

FIG. 3 more schematically illustrates the system depicted in part in FIG. 2 by showing the overlap between a pair of adjacent base stations having their axis (antennae) at B1 and B2 respectively. As illustrated, the horizontal dash lines 12 and 14 indicate the exit and entry threshold bit or symbol error levels as depicted by the circle 12 and 14 in FIG. 2.

In the simplistic arrangement illustrated in FIG. 3, the coverage boundary from base station or channel B1 is indicated by the radius or distance RCB1 whereas the boundary for base B2 is indicated by distance RCB2. Assuming the mobile is travelling from B1 toward B2 when it reaches radius RXB1 where the curve C1 representing the signal (bit or symbol) error rate for B1 traverses the exit threshold line 12, the mobile will commence to seek another base station and will select such a base station within the distance Y i.e. before it is out of range of station B1 as designated by the distance RCB1 where the curve C1 traverses the base of the graph which is an unacceptable error rate. The distance Y is the equivalent of RCB1−RXB1 and this distance Y will be sufficient under normal circumstances for a transfer to a selected base station to be completed. It will be noted that in FIG. 3 the bit or symbol error rate is higher the lower the point on the curve C1.

In the arrangement illustrated, it can be seen that at distance RXB1 from B1 the mobile is within the radius REB2 from B2 which is the outer radius of the entry threshold bit or symbol error rate of channel or base B2 i.e. where the curve B2 representing the signal (bit or symbol) error rate for B2 crosses the entry threshold line 14 and assuming B2 is the first station found by the mobile having the required minimum acceptable bit or symbol error rate for entry the mobile will automatically tune to and communicate with station B2.

Similarly, a mobile communicating with base station B2 and travelling toward base station B1 will commence seeking an alternative station when it reaches radius RXB2 from B2 and can travel the radial distance X away from the station B2 and maintain acceptable communication with B2 while finding the alternative station to select. The distance X obviously in the illustrated case also indicates the overlap in radii between B2 and B1 where the bit or symbol error rate for the signal from B2 is above the exit bit or symbol error rate threshold and the signal form B1 is below the entry bit or symbol error rate threshold so that the mobile travelling from B2 assuming it found B1 first would automatically transfer to B1.

Figure 4:
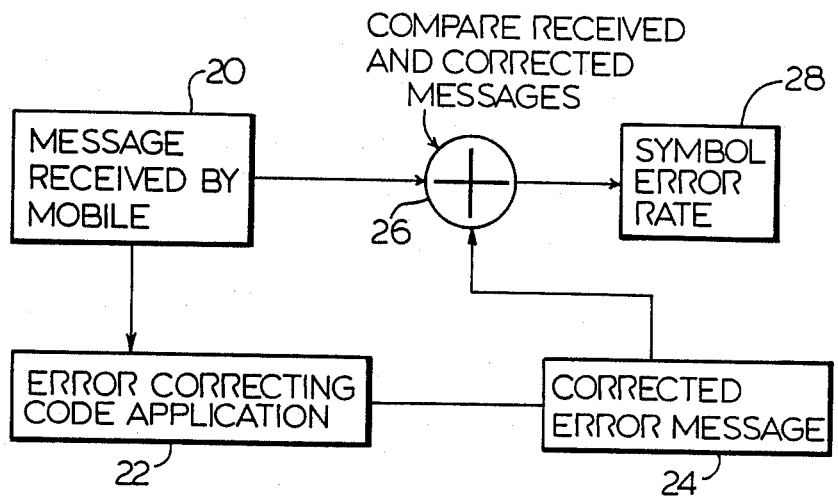
FIG. 4 schematically illustrates one technique for determining the bit or symbol error rate of the received messages.
Figure 5:
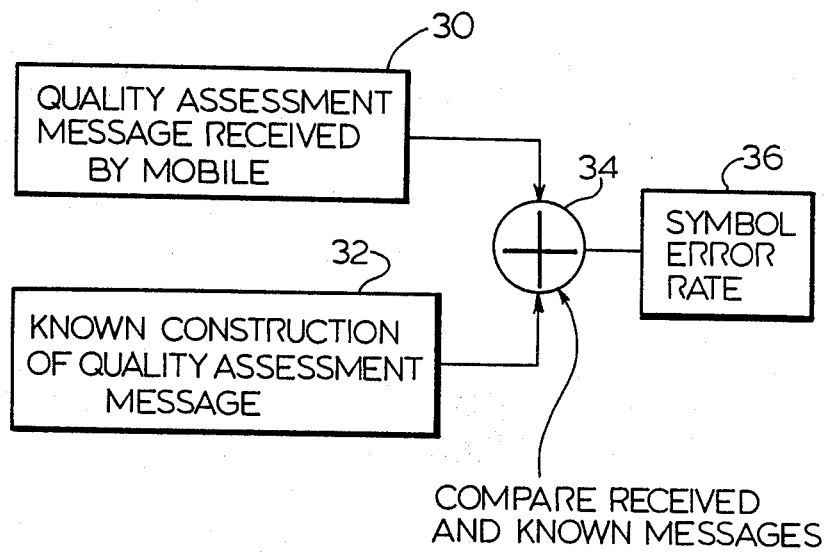
FIG. 5 schematically illustrates a preferred method of determining the bit or symbol error rate of received known quality assessment messages.

The bit or symbol error rate may be determined in several different ways as shown for example in FIGS. 4 and 5.

In the system illustrated in FIG. 4, ordinary messages are sent by a base station and these messages are received by the mobile as indicated by the box 20. These messages are then error corrected by means of a suitable error correction code application as indicated by the box 22. Any suitable error correction code system may be used, for example, algorithms such as Kasami, Pocsag or the Reed-Solomon error correcting codes to name a few. The received message is corrected by the error correcting code and provides a corrected message as indicated by the box 24. This corrected message is then compared with the message received by the mobile as indicated at 26 to determine the bit or symbol error rates indicated at 28. The bit or symbol error rate is the used as above described to assess the signal quality from the station.

A preferred arrangement is shown in FIG. 5 wherein instead of simply utilizing ordinary transmitted and received messages and comparing the received message with the corrected message each base station transmits a known quality assessment message on a periodic basis. This known quality assessment message received by the mobile is compared with what the mobile knows the message should contain and the bit or symbol error rate determined. Thus the quality assessment message is received by the mobile as indicated by the box 30 the known construction of the quality assessment message is stored within the mobile as indicated at 32 and the two are compared as indicated by the symbol 34 to produce a bit or symbol error rate as indicated by the box 36. This bit or symbol error rate is used to determined whether the signal being received is below or above the exit or entry threshold levels for transfer from one channel or base to another.

The comparing units 26 and 34 will operate on the basis of comparing the messages bit by bit i.e. using a bitwise exclusive or system or a symbol by symbol comparison to count the number of bits or symbols that do not match between the received message and the message with which it is being compared. It will be apparent that when this technique is used, a bit or symbol error rate is obtained for the signal received.

The quality assessment messages transmitted by the various base stations are fixed data packets containing a known pattern of a few thousand bits, they are periodically transmitted on every outbound channel at a rate frequent enough for channel quality evaluation while conserving the available channel capacity. The bit or symbol error rate is preferably averaged over a preselected period of time so that several packets rather than a single data packet are used to estimate signal quality. For example, the bit or symbol error rate may be determined for 5 and in any event for at least 2 data packets or messages which will be transmitted spaced at 2-second intervals to determine the average bit or symbol error rate. When this average bit or symbol error rate exceeds a exit threshold level which for example may be set at finding a 1% error in the quality of the signal transmitted, the mobile will immediately seek an alternative channel. In so doing, the mobile will tune to each adjacent base station sequentially monitoring each station for its bit or symbol error rate until it finds the first base station having a bit or symbol error rate below the entry threshold which may be selectively set at any desired level significantly below the exit threshold. For the purpose of this example a 0.3% error in the signal has been set as the entry threshold bit or symbol error level.

When an alternative station has been selected the mobile station automatically transfers to the selected base station and notifies the control station of the transfer so that the messages to be relayed will automatically be relayed through the correct base station.

When ordinary messages are error-corrected to provide the error rate it may be necessary for mobiles to receive and assess messages directed to other mobiles to assess the error rate on adjacent channels when a transfer is to be made. This is not necessary when the system of known quality assessment messages is used as these messages may be universally coded and available to all mobiles.

Clearly, each message used by a mobile to assess the bit or symbol error rate for changing channels or base stations must in some way be labeled, for example by coding or frequency, to identify the base station sending the message so that the mobile can complete the transfer.

For simplicity, the term symbol has been used in the drawings to represent both a bit or a symbol in depicting the error rates or levels.

Having described the invention modifications will be evident to those skilled in the art with out departing from the spirit of the invention as defined in the appended claims.

We claim:

1. A cell transfer method for automatically transferring communication between a mobile and a first base station from said first base station to a selected second base station comprising, transmitting messages from each base station of a plurality of base stations, said mobile monitoring said messages transmitted by said first base station and received by said mobile and determining a bit or symbol error rate based on the received signal for at least some of said messages transmitted from said first station and received by said mobile, when said mobile detects a bit or symbol error rate in said at least some messages received from said first station above a threshold exit bit or symbol error rate, said mobile automatically sequentially monitoring and assessing said messages transmitted from adjacent of said base stations, selecting a selected second base station based on said messages from said selected second base station having an assessed bit or symbol error rate as detected by said mobile below a selected entry threshold bit or symbol error rate and said mobile transferring to communicate with said selected second base station.

2. A method as defined in claim 1 wherein said transmitted messages are known quality assessment messages and wherein each base station will periodically transmit said known quality assessment messages and said mobile assesses said known quality assessment messages emanating from the base station with which it is communicating by comparing the known quality assessment message as received with the known quality assessment message and initiates said search for a replacement base station when the error rate detected in the quality assessment messages being assessed by the mobile exceeds said preset exit threshold level and said mobile selects said replacement base station by assessing the known quality assessment messages from adjacent base stations until one is found having a bit or symbol error rate less than a preset entry threshold symbol error rate that is less than said exit threshold bit or symbol error rate by a preset amount.

3. A cell transfer method as defined in claim 2 wherein said mobile monitors each said signal representing the quality assessment message being assessed by said mobile over a period of time to assess at least two (2) transmission of said known message by the base station being monitored and averages the bit or symbol error rates for said at least 2 transmissions to determine the symbol error rate for the base station being assessed.

4. A method as defined in claim 2 wherein said comparing comprises comparing each respective bit in the two said messages being compared.

5. Cell transfer method as defined in claim 1 wherein said symbol error rate is determined by said mobile error correcting a message as received by said mobile using error correcting codes to provide a corrected message and comparing said corrected message with the message as received and before correction.

6. A method for assessing the bit or symbol error rate for the signals received by a mobile from a base station or vice versa comprising receiving a message, correcting said received message using error correcting codes to provide a corrected message, comparing said received message with said corrected message and determining the difference between the two messages to provide said bit or symbol error rate.

7. A method as defined in claim 6 wherein said comparing comprises comparing each respective bit in the two said messages being compared.

* * * * *